(12) United States Patent
Ueno

(10) Patent No.: US 8,145,407 B2
(45) Date of Patent: Mar. 27, 2012

(54) ENERGY-EFFICIENT AUTOMOBILE

(75) Inventor: Ryuji Ueno, Potomac, MD (US)

(73) Assignee: Rusk Intellectual Reserve AG, Zug (CH)

( * ) Notice: Subject to any disclaimer, the term of this patent is extended or adjusted under 35 U.S.C. 154(b) by 499 days.

(21) Appl. No.: 12/463,660

(22) Filed: May 11, 2009

(65) Prior Publication Data

US 2009/0281711 A1 Nov. 12, 2009

Related U.S. Application Data

(60) Provisional application No. 61/071,670, filed on May 12, 2008.

(51) Int. Cl.
*F02D 41/30* (2006.01)
*G06F 19/00* (2011.01)

(52) U.S. Cl. .................................. 701/104; 123/399

(58) Field of Classification Search .......... 701/103–105, 701/101, 102, 115; 123/361, 399, 478, 480
See application file for complete search history.

(56) References Cited

U.S. PATENT DOCUMENTS

| | | | | | |
|---|---|---|---|---|---|
| 3,913,418 | A | * | 10/1975 | Miyao et al. ................... | 60/431 |
| 4,418,673 | A | * | 12/1983 | Tominari et al. ............... | 123/399 |
| 4,430,975 | A | * | 2/1984 | Ishida et al. ................... | 123/399 |
| 5,078,107 | A | * | 1/1992 | Morikawa ....................... | 123/295 |
| 6,947,827 | B2 | * | 9/2005 | Fuse et al. ...................... | 701/110 |

FOREIGN PATENT DOCUMENTS

| | | |
|---|---|---|
| JP | 2001-280180 A | 10/2001 |
| JP | 2002-199513 A | 7/2002 |
| JP | 2007-64191 A | 3/2007 |

* cited by examiner

*Primary Examiner* — Hieu T Vo
(74) *Attorney, Agent, or Firm* — Birch, Stewart, Kolasch & Birch, LLP

(57) ABSTRACT

Disclosed is an automobile equipped with an engine having an electronically-controlled throttle valve adapted to have an opening angle which is controlled according to an accelerator-pedal depression amount. The engine further includes an accelerator pedal sensor, an actuator adapted to selectively open and close the throttle valve, and a controller. The controller is adapted to calculate a target throttle opening angle corresponding to the accelerator-pedal depression amount, and output a continuous control signal corresponding to the target throttle opening angle, to the actuator. The controller is operable, in a traveling environment of the automobile or an operating condition of the engine where a required engine power is less than an engine power corresponding to the target throttle opening angle, to convert the continuous control signal into a pulsed control signal, and output the pulsed control signal to the actuator.

19 Claims, 10 Drawing Sheets

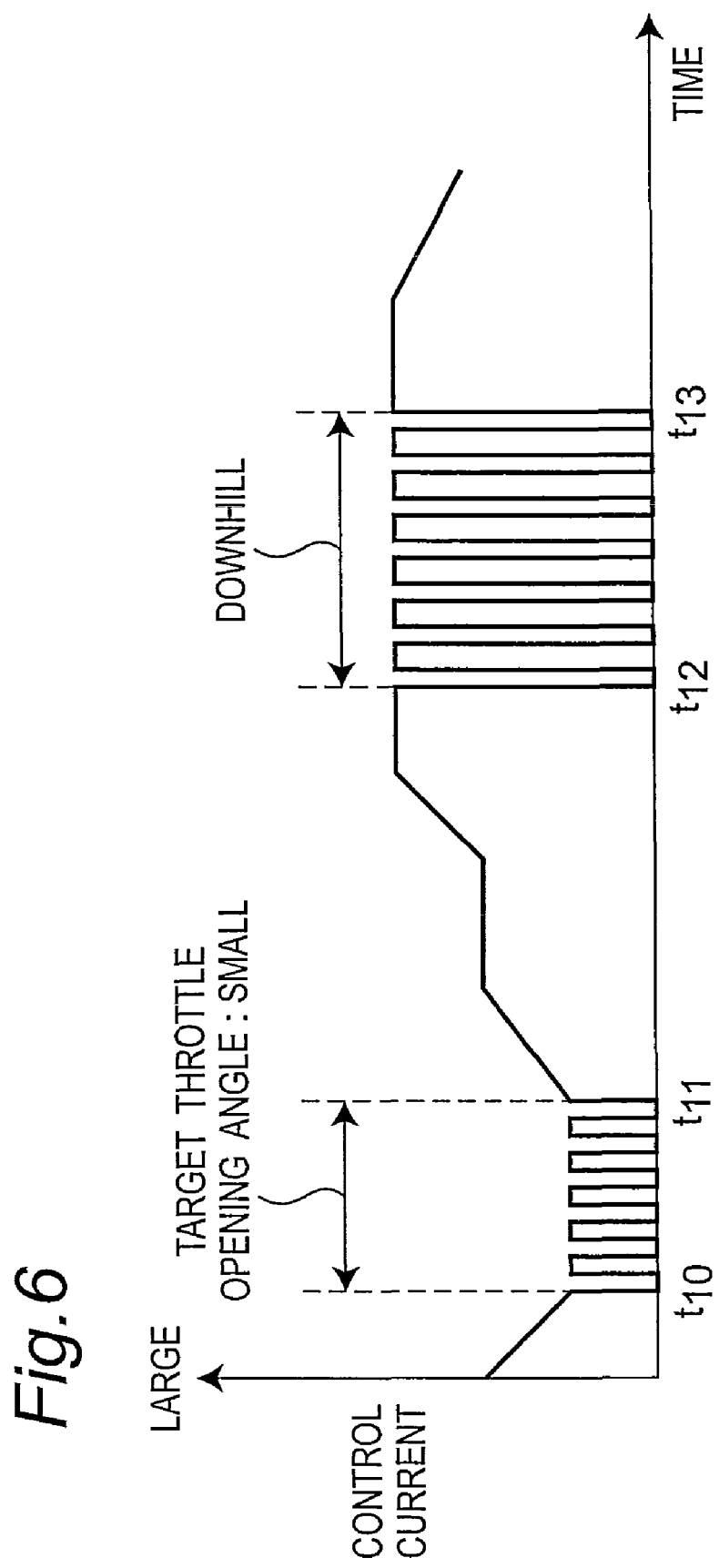

ENERGY-EFFICIENT AUTOMOBILE

BACKGROUND OF THE INVENTION

The present invention relates to an energy-efficient automobile adapted to reduce a motive-power generation amount of a prime mover, in a traveling environment or an operating condition where a motive power required for traveling is less than a motive power corresponding to an amount of depression of an accelerator pedal.

Generally, in an automobile, a motive power to be generated by a prime mover is controlled by manipulating an accelerator pedal. For example, in an automobile equipped with a spark-ignition engine having an electronically-controlled throttle valve, a target opening angle of the throttle valve corresponding to an amount of depression of an accelerator pedal detected by an accelerator pedal sensor (the amount will hereinafter be referred to as "accelerator-pedal depression amount") is calculated, and a control signal corresponding to the calculated target opening angle is output to an actuator of the throttle valve to control an opening angle of the throttle valve and eventually control a motive power to be generated by the engine (see, for example, JP 2001-280180A).

In an automobile equipped with a diesel engine having an electronically-controlled injector, a target fuel injection amount of the injector corresponding to an accelerator-pedal depression amount is calculated, and a control signal corresponding to the calculated target fuel injection amount is output to the injector to control a fuel injection amount of the injector and eventually control a motive power to be generated by the engine (see, for example, JP 2007-064191A). In an electric automobile equipped with an electric motor as a prime mover, an electricity corresponding to an accelerator-pedal depression amount is supplied to the electric motor to control a motive power to be generated by the electric motor (see, for example, JP 2002-199513A).

As above, in an automobile equipped with a prime mover, such as a spark-ignition engine, a diesel engine or an electric motor, a motive power conforming to driver's intention is output from the prime mover, according to an accelerator-pedal depression amount. However, depending on a traveling environment or an operating condition, it is not always necessary to output a motive power corresponding to an accelerator-pedal depression amount during operation of the automobile.

For example, when the automobile is traveling on a road surface having a relatively steep downward slope, or when a relatively strong tail wind is blowing to the automobile being traveling, an external force is applied to the automobile in a forward traveling direction thereof, and thereby the motive power of the prime mover becomes excessive by just as much as the external force. Thus, the conventional automobile has a problem that fuel or energy is uselessly consumed in a situation where a required motive power is less than a motive power corresponding to an accelerator-pedal depression amount, resulting in deterioration in energy efficiency thereof.

SUMMARY OF THE INVENTION

In view of the above conventional problem, it is an object of the present invention to provide an automobile capable of, in a situation where a required motive power is less than a motive power corresponding to an accelerator-pedal depression amount, preventing useless consumption of fuel or energy and eventually enhancing energy efficiency.

In order to achieve the above object, an automobile according to a first aspect of the present invention comprises a prime mover, an energy-source supply system, an accelerator pedal, an accelerator pedal sensor, and a controller. In this automobile, the prime mover is adapted to generate motive power from an energy source (e.g., fuel or electricity). The energy-source supply system is adapted to supply an energy source to the prime mover. The accelerator pedal is adapted to be manipulated according to a depressing action by a driver. The accelerator pedal sensor is adapted to detect an accelerator-pedal depression amount (i.e., a depression amount of the accelerator pedal). The controller is adapted to calculate a target operating amount of the energy-source supply system corresponding to the accelerator-pedal depression amount detected by the accelerator pedal sensor, and output a continuous-waveform control signal (hereinafter referred to as "continuous control signal") corresponding to the target operating amount to the energy-source supply system to actuate the energy-source supply system. The controller is operable, in a traveling environment or an operating condition where a motive power required for the prime mover is less than a motive power corresponding to the target operating amount, to convert the continuous control signal into a pulsed control signal which has a pulse height equal to a magnitude of the continuous control signal, a predetermined pulse width and a predetermined interpulse interval, and output the pulsed control signal to the energy-source supply system.

In the automobile according to the first aspect of the present invention, for example, a spark-ignition engine may be used as the prime mover. In this case, the energy-source supply system may comprise an electronically-controlled throttle valve adapted to have an opening angle which is controlled according to the accelerator-pedal depression amount, and a fuel injection valve adapted to supply fuel to the engine at a predetermined rate with respect to air flowing through the throttle valve (air-fuel ratio). For example, fuel for a spark-ignition engine, such as gasoline, propane or hydrogen, may be used as the energy source. The controller is adapted to calculate a target opening angle of the throttle valve (hereinafter referred to as "target throttle opening angle") corresponding to the accelerator-pedal depression amount, and output a continuous control signal corresponding to the target throttle opening angle to the throttle valve to actuate the throttle valve.

In the automobile according to the first aspect of the present invention, the operating condition may include a target throttle opening angle. Preferably, the controller may be operable, when the target throttle opening angle is equal to or less than a reference value (e.g., ⅕ to ⅒ of a throttle opening angle in a fully opened position of the throttle valve), to convert the continuous control signal into the pulsed control signal.

In the automobile according to the first aspect of the present invention, an electric motor (e.g., a DC series-wound motor) may also be used as the prime mover. In this case, the energy-source supply system may comprise a voltage supply circuit adapted to control a supply voltage for the electric motor, according to the accelerator-pedal depression amount. The energy source is electricity or electric energy. The controller is adapted to calculate a target supply voltage (target operating amount) of the voltage supply circuit corresponding to the accelerator-pedal depression amount, and output a continuous control signal corresponding to the target supply voltage to the voltage supply circuit to actuate the voltage supply circuit.

In the automobile using an electric motor as the prime mover, a variable resistor circuit connected in series with the electric motor and adapted to have an electric resistance which is controlled according to the accelerator-pedal depression amount, may be used as the voltage supply circuit. In this case, the controller is adapted to calculate a target electric resistance of the variable resistor circuit corresponding to the accelerator-pedal depression amount, and output a continuous control signal corresponding to the target electric resistance to the variable resistor circuit to actuate the variable resistor circuit.

Preferably, the automobile according to the first aspect of the present invention comprises at least one selected from the group consisting of: road surface slope-detecting means adapted to detect a slope of a road surface on which the automobile is traveling; road surface flatness-detecting means adapted to detect a flatness of the road surface; and a wind velocity/wind direction detector adapted to detect a velocity and a direction of a wind surrounding the automobile. In this case, it is preferable that the road surface slope-detecting means is provided with a GPS receiving device, and adapted to detect a slope of the road surface, based on GPS radio waves received by the GPS receiving device. Further, it is preferable that the road surface flatness-detecting means is provided with an image pickup camera, and adapted to detect a flatness of the road surface, based on an image picked up by the image pickup camera to represent a scene forward of the automobile.

In the automobile according to the first aspect of the present invention, the traveling environment may include at least one selected from the group consisting of: a slope of a road surface on which the automobile is traveling; a flatness of the road surface; and a velocity and a direction of a wind surrounding the automobile. Preferably, the controller may be operable, under at least one of the conditions that a downward slope of the road surface is equal to or greater than a reference value (e.g., 3 to 5 degrees), that a flatness of the road surface is better than a reference state, and that a velocity of a tail wind is equal to or greater than a reference value (e.g., 10 to 15 m/sec), to convert the continuous control signal into the pulsed control signal.

An automobile according to a second aspect of the present invention comprises a prime mover, an energy-source supply system, an accelerator pedal, an accelerator pedal sensor, and a controller, fundamentally as with the automobile according to the first aspect of the present invention. Differently from the automobile according to the first aspect of the present invention, in the automobile according to the second aspect of the present invention, the controller is adapted to output a pulsed-waveform control signal (hereinafter referred to as "pulsed control signal") corresponding to the target operating amount to the energy-source supply system to actuate the energy-source supply system. The controller is operable, in a traveling environment or an operating condition where a motive power required for the prime mover is less than a motive power corresponding to the target operating amount, to reduce a pulse width of the pulsed control signal to form a modified pulsed control signal, and then output the modified pulsed control signal to the energy-source supply system.

In the automobile according to the second aspect of the present invention, for example, a diesel engine may be used as the prime mover. In this case, the energy-source supply system may comprise an electronically-controlled injector adapted to have a fuel injection amount which is controlled according to the accelerator-pedal depression amount. In this case, fuel for a diesel engine, such as light oil (diesel oil) or heating oil (kerosene), may be used as the energy source. The controller is adapted to calculate a target fuel injection amount (target operating amount) of the injector corresponding to the accelerator-pedal depression amount, and output a pulsed control signal corresponding to the target fuel injection amount to the injector to actuate the injector.

In the automobile according to the second aspect of the present invention, an electric motor (e.g., a DC series-wound motor) may also be used as the prime mover. In this case, the energy-source supply system may comprise an electronically-controlled chopper circuit adapted to control an ON/OFF ratio (duty ratio) of a supply voltage for the electric motor, according to the accelerator-pedal depression amount. The energy source is electricity. The controller is adapted to calculate a target ON/OFF ratio (target operating amount) of the chopper circuit corresponding to the accelerator-pedal depression amount, and output a pulsed control signal corresponding to the target ON/OFF ratio to the chopper circuit to actuate the chopper circuit.

Preferably, the automobile according to the second aspect of the present invention comprises at least one selected from the group consisting of: road surface slope-detecting means adapted to detect a slope of a road surface on which the automobile is traveling (e.g., the road surface slope-detecting means is provided with a GPS receiving device); road surface flatness-detecting means adapted to detect a flatness of the road surface (e.g., the road surface flatness-detecting means is provided with an image pickup camera); and a wind velocity/wind direction detector adapted to detect a velocity and a direction of a wind surrounding the automobile, as with the automobile according to the first aspect of the present invention. In the automobile according to the second aspect of the present invention, the traveling environment may include at least one selected from the group consisting of: a slope of a road surface on which the automobile is traveling; a flatness of the road surface; and a velocity and a direction of a wind surrounding the automobile, as with the automobile according to the first aspect of the present invention. Preferably, the controller is operable, under at least one of the conditions that a downward slope of the road surface is equal to or greater than a reference value, that a flatness of the road surface is better than a reference state, and that a velocity of a tail wind is equal to or greater than a reference value, to reduce a pulse width of the pulsed control signal.

As above, in the automobile according to the first aspect of the present invention, in a traveling environment or an operating condition where a motive power actually required for the automobile is less than a motive power corresponding to an accelerator-pedal depression amount (or a target operating amount), the continuous control signal is converted into the pulsed control signal. In a period where the continuous control signal is converted into the pulsed control signal in the above manner, an output of the continuous control signal corresponding to the target operating amount is interrupted during respective interpulse intervals, and thereby an amount of the energy source to be supplied from the energy-source supply system to the prime mover is reduced by just as much as equivalent to the interruption. This makes it possible to prevent useless consumption of the energy source, such as fuel or electricity and eventually enhance energy efficiency of the automobile.

In the automobile according to the second aspect of the present invention, in a traveling environment or an operating condition where a motive power actually required for the automobile is less than a motive power corresponding to an accelerator-pedal depression amount (or a target operating amount), a pulse width of the pulsed control signal is reduced to form a modified pulsed control signal. In a period where the modified pulsed control signal having a reduced pulse width is used, an output of the pulsed control signal corresponding to the target operating amount is reduced by just as much as equivalent to a reduction in pulse width, and thereby an amount of the energy source to be supplied from the energy-source supply system to the prime mover is reduced. This makes it possible to prevent useless consumption of the energy source, such as fuel or electricity and eventually enhance energy efficiency of the automobile.

BRIEF DESCRIPTION OF THE DRAWINGS

Various characteristics and advantages of the present invention will become clear from the following description taken in conjunction with the preferred embodiments with reference to the accompanying drawings throughout which like parts are designated by like reference numerals, in which:

FIG. 6 is a graph showing one example of a temporal change characteristic of the throttle control current or a pulsed control current, during a control current-pulsing control;

DETAILED DESCRIPTION OF THE PREFERRED EMBODIMENTS

With reference to the accompanying drawings, the present invention will now be specifically described based on first to fourth embodiments thereof. The first embodiment relates to an automobile equipped with a spark-ignition engine as a prime mover, and the second embodiment relates to an automobile equipped with a diesel engine as the prime mover. Further, each of the third and fourth embodiments relates to an electric automobile equipped with an electric motor as the prime mover.

Figure 1:
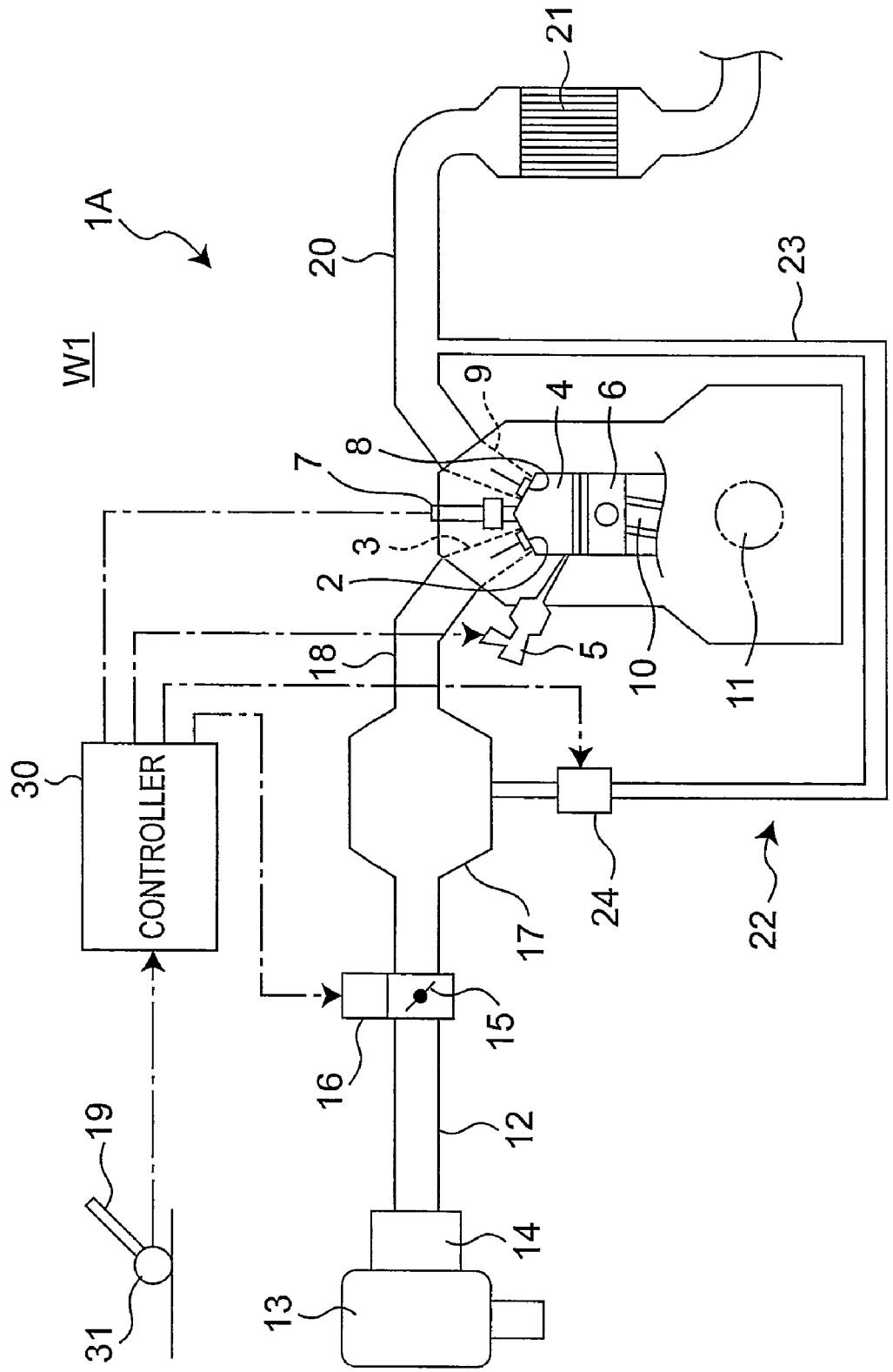
FIG. 1 is a schematic diagram showing a system configuration of a spark-ignition engine mounted on an automobile according to a first embodiment of the present invention.

(First Embodiment) As shown in FIG. 1, an automobile W1 according to the first embodiment is equipped with a spark-ignition multicylinder engine 1A using gasoline as fuel (only one of a plurality of cylinders is illustrated). In each of the cylinders of the engine 1A, when an intake valve 2 is opened during an intake stroke, air for combustion of fuel (combustion air) is sucked from an intake port 3 into a combustion chamber 4. Subsequently, at a given timing during a compression stroke, fuel is injected from an injector 5 (fuel injection valve) into the air in the combustion chamber 4 to form an air-fuel mixture. In this compression stroke, the air-fuel mixture in the combustion chamber 4 is compressed by a piston 6. The compressed air-fuel mixture in the combustion chamber 4 is ignited by a spark plug 7 at a given timing around a top dead center of the compression stroke to undergo combustion, and, during an expansion stroke, the piston 6 is moved downwardly by a pressure of the resulting combustion gas (burned gas). Then, when an exhaust valve 8 is opened during an exhaust stroke, the combustion gas is discharged into an exhaust port 9.

The above four strokes, i.e., intake, compression, expansion and exhaust strokes, are successively repeated to allow the piston 6 to be reciprocatingly moved within the cylinder in a repeated manner. The reciprocating movement of the piston 6 is converted into a rotational movement of a crankshaft 11 through a connecting rod 10 and others. The rotational movement of the crankshaft 11 is taken out from the engine 1A as output motive power thereof, to allow for traveling of the automobile W1 equipped with the engine 1A, and drive auxiliary components, such as an alternator and an air conditioner (not shown).

An intake system for supplying combustion air into the combustion chamber 4 in each of the cylinders of the engine 1A includes a single common intake pipe 12 common to all the cylinders. The common intake pipe 12 has an upstream end opened to atmosphere, and an upstream end-adjacent portion which is provided with an air cleaner 13 adapted to remove foreign matters, such as dust, from air sucked into the common intake pipe 12, and an airflow sensor 14 adapted to detect a flow rate of air in the common intake pipe 12. The common intake pipe 12 is further provided with a throttle valve 15 adapted to restrict a flow of air in the common intake pipe 12 according to an accelerator-pedal depression amount, i.e., an amount of depression of an accelerator pedal 19. The throttle valve 15 is an electronically-controlled throttle valve adapted to have an opening angle which is controlled according to an accelerator-pedal depression amount by an electric actuator 16, as described in detail later.

The common intake pipe 12 has a downstream end connected to a surge tank 17 adapted to attenuate pulsation of air to be supplied to the combustion chamber 4 in each of the cylinders, so as to stabilize a flow of the air. The surge tank 17 is connected with a plurality of branched intake pipes 18 each adapted to supply air to the combustion chamber 4 in a corresponding one of the cylinders, individually, and each of the branched intake pipes 18 has a downstream end connected to the intake port 3 in the corresponding cylinder. In the first embodiment, the engine 1A is a direct-injection engine adapted to directly inject fuel into each of the combustion chambers 4. Alternatively, the engine 1A may be a port-injection engine adapted to inject fuel into each of the intake ports 3 or the branched intake pipes 18 to form an air-fuel mixture. In the port-injection engine, a plurality of injectors are installed in respective ones of the branched intake pipes 18 to inject fuel toward respective ones of the intake ports 3.

The engine 1A is also provided with an exhaust system for emitting exhaust gas discharged from the combustion chambers 4, to atmosphere therethrough. The exhaust system includes a single common exhaust pipe 20 common to all the cylinders. In this regard, however, an upstream end-adjacent portion of the common exhaust pipe 20 in a direction of an exhaust gas flow is branched into a plurality of cylinder-by-cylinder sub-pipes each connected to the exhaust port 9 in a corresponding one of the cylinders. The common exhaust pipe 20 is provided with a catalytic converter 21 using a three-way catalyst to purify CO (carbon monoxide), HC (hydrocarbon) and NOx (nitrogen oxides) in exhaust gas.

The engine 1A is further provided with an EGR system for recirculating, as EGR gas, a part of exhaust gas in the common exhaust pipe 20 in order to lower a temperature of combustion of an air-fuel mixture to reduce an amount of generation of NOx. The EGR system includes an EGR passage 23 serving as a flow passage of EGR gas. An upstream end of the EGR passage 23 in a direction of an EGR gas flow is connected to the common exhaust pipe 20 at a position upstream of the catalytic converter 21 in the direction of the exhaust gas flow. Further, a downstream end of the EGR passage 23 is connected to the surge tank 17. The EGR passage 23 is provided with an EGR valve 24 adapted to control a flow rate of EGR gas.

Figure 2:
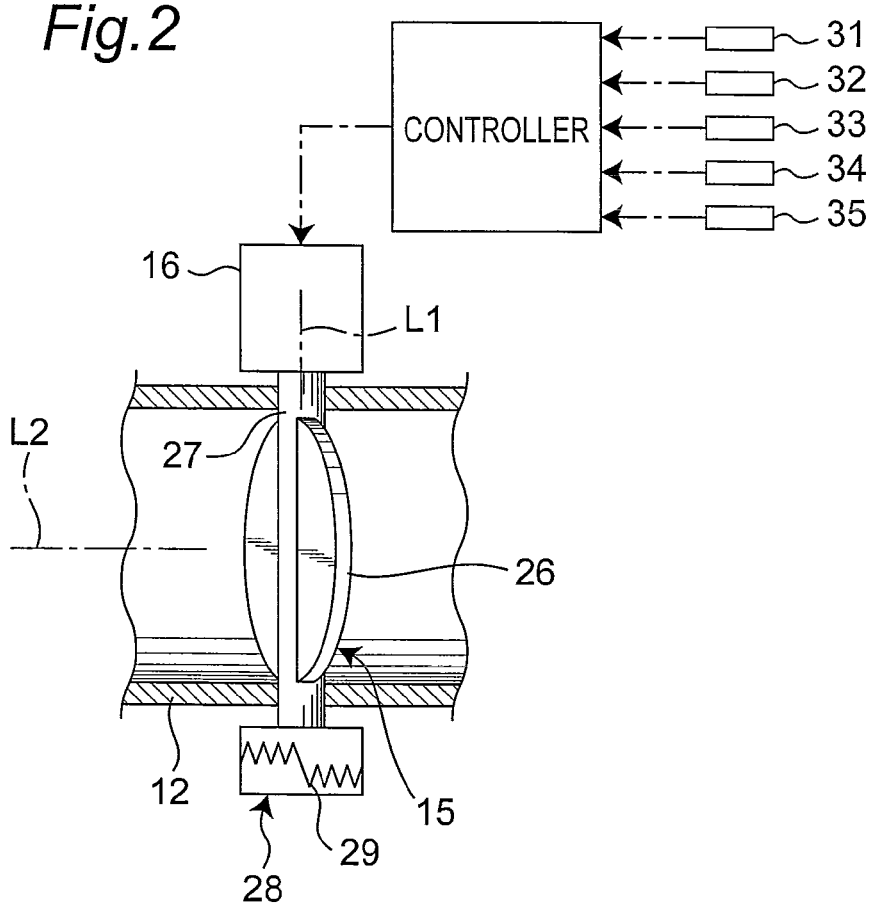
FIG. 2 is a schematic diagram showing a structure of a throttle valve of the engine illustrated in FIG. 1.

As shown in FIG. 2, the throttle valve 15 comprises a butterfly valve element 26 disposed inside the common intake pipe 12, and a rotary shaft 27 which extends to penetrate through the common intake pipe 12 in a diametral direction thereof and supports the butterfly valve element 26. When the rotary shaft 27 is rotated about a central axis L1 thereof, the butterfly valve element 26 is integrally rotated together with the rotary shaft 27 to selectively open and close the common intake pipe 12. The rotary shaft 27 (and thus the butterfly valve element 26) is adapted to be rotated about the central axis L1 by about 90 degrees.

When a broad surface of the butterfly valve element 26 is set in a posture approximately perpendicular to a central axis L2 of the common intake pipe 12, the butterfly valve element 26 is in a fully closed position. On the other hand, when the broad surface of the butterfly valve element 26 is set in a posture approximately parallel to the central axis L2 of the common intake pipe 12, the butterfly valve element 26 is in a fully opened position. Even when the butterfly valve element 26 (the throttle valve 15) is in the fully closed position, a given gap is defined between the butterfly valve element 26 and the common intake pipe 12, so that air required for an idling operation of the engine 1A can flow through the gap.

The rotary shaft 27 of the throttle valve 15 has one end coupled to an actuator 16 outside the common intake pipe 12, and the other end coupled to a rotary shaft-returning mechanism 28 outside the common intake pipe 12. The rotary shaft-returning mechanism 28 includes a return spring 29, and biases the rotary shaft 27 (and thus the butterfly valve element 26) in a direction for moving the butterfly valve element 26 toward the fully closed position, by a biasing force of the return spring 29. The actuator 16 is adapted to, according to a current (or voltage) supplied thereto, rotationally drive the rotary shaft 27 (and thus the butterfly valve element 26) in a direction for moving the butterfly valve element 26 toward the fully opened position, against the biasing force of the return spring 29.

Thus, when no current is supplied to the actuator 16, i.e., a supply current value is 0 (zero), the butterfly valve element 26 is moved to the fully closed position by the biasing force of the return spring 29. On the other hand, when a current is supplied to the actuator 16, the butterfly valve element 26 is opened according to a magnitude of the supply current. Specifically, when a maximum current is supplied to the actuator 16, the butterfly valve element 26 is moved to the fully opened position. The rotary shaft-returning mechanism 28 is provided with a stopper (not shown) for preventing the butterfly valve element 26 from being rotated beyond the fully open position.

A control system of the engine 1A or the automobile W1 will be described below. As shown in FIGS. 1 and 2, the engine 1A is provided with an accelerator pedal sensor 31 installed along the accelerator pedal 19 and adapted to detect an accelerator-pedal depression amount, a road-surface slope sensor 32 adapted to detect a slope of a road surface on which the automobile W1 is traveling, and a wind velocity/wind direction sensor 33 adapted to detect a velocity and a direction of a wind surrounding the automobile W1. Further, the automobile W1 is provided with an image pickup camera 34 (video camera) adapted to pick up an image forward of the automobile W1, and a GPS receiving device 35. More specifically, the image pickup camera 34 is adapted to continuously pick up an image representing a scene, such as a road, forward of the automobile W1. The GPS receiving device 35 is adapted to receive GPS radio waves from a GPS (global positioning system).

Although not illustrated because of little relevance to the subject matter of the present invention, the engine 1A is further provided with various sensors for collecting various information about an operating condition of the engine 1A, such as an intake temperature adapted to detect a temperature of air in the common intake pipe 12, an intake pressure sensor adapted to detect a pressure of air in the common intake pipe 12, a coolant temperature sensor adapted to detect a temperature of coolant of the engine 1A, an engine speed sensor adapted to detect a rotation number of the crank shaft 11 (an engine speed), and a crank angle sensor adapted to detect a crank angle. A detection signal of each of the above sensors is input into a controller 30 as control information for the engine 1A.

The controller 30 is a general control unit for the automobile W1, or the engine 1A or its associated device. Although not illustrated in detail, the controller 30 is a computer which comprises an input/output section (interface) for inputting and outputting a control signal, a storage section (ROM, RAM, etc.) for storing therein data, control information and others, a central processing unit (CPU) for performing various arithmetic processings, a timer, and a counter. The controller 30 is operable to analyze an image picked up by the image pickup camera 34 to represent a scene forward of the automobile W1, and measure or evaluate a state of a road on which the automobile is traveling, such as a flatness of a road surface. The controller 30 is also operable, based on GPS radio waves received by the GPS receiving device 35, to calculate various data, such as a position where the automobile W1 is traveling, and a slope of a road on which the automobile W1 is traveling.

Then, the controller 30 is operable, based on various data detected by the sensors 14, 31 to 33, the image pickup camera 34, the GPS receiving device 35 and others, and various evaluated or calculated data, to control or drive the injectors 5, the spark plugs 7, the actuator 16, the EGR valve 24 and others so as to perform normal controls of the engine 1A, such as normal fuel injection control, normal ignition timing control, and normal EGR control. A technique for each of the normal controls of the engine 1A is commonly known to those skilled in the art, and is not the subject matter of the present invention. Thus, its description will be omitted.

Further, the controller 30 is operable, when the engine 1A (or the automobile W1) is in an operating condition (or in a traveling environment) where a required motive power of the engine 1A is less than a motive power of the engine 1A (hereinafter referred to as "engine power") corresponding to an accelerator-pedal depression amount (or a target throttle opening angle), to perform a control of converting a continuous control current (hereinafter referred to as "throttle control current") or a continuous control voltage to be supplied to the actuator 16, into a pulsed control current or a pulsed control voltage which has a pulse height equal to a magnitude of the throttle control current (this control will hereinafter be referred to as "current-pulsing control").

Figure 3:
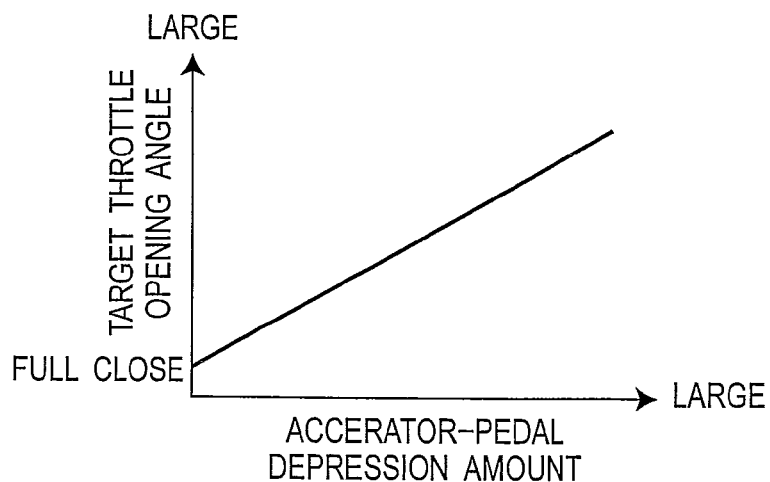
FIG. 3 is a graph showing a relationship between a target throttle opening angle and an accelerator-pedal depression amount, in the engine illustrated in FIG. 1.

A technique of the current-pulsing control in the first embodiment of the present invention will be described below. For example, as shown in FIG. 3, the controller 30 is operable to gradually increase a target throttle opening angle or a throttle opening angle along with an increase in an accelerator-pedal depression amount. In the example illustrated in FIG. 3, the target throttle opening angle is set to be increased in proportion to the accelerator-pedal depression amount. However, a relationship between the target throttle opening angle and the accelerator-pedal depression amount is not limited to such a proportional relationship, but may be set in any desired characteristic. For example, an increase rate of the target throttle opening angle relative to the accelerator-pedal depression amount may be set to become larger along with an increase in the accelerator-pedal depression amount (a concave curve in a direction for increasing the accelerator-pedal depression amount) or may be reversely set to become smaller along with an increase in the accelerator-pedal depression amount (a convex curve in a direction for increasing the accelerator-pedal depression amount).

Figure 4:
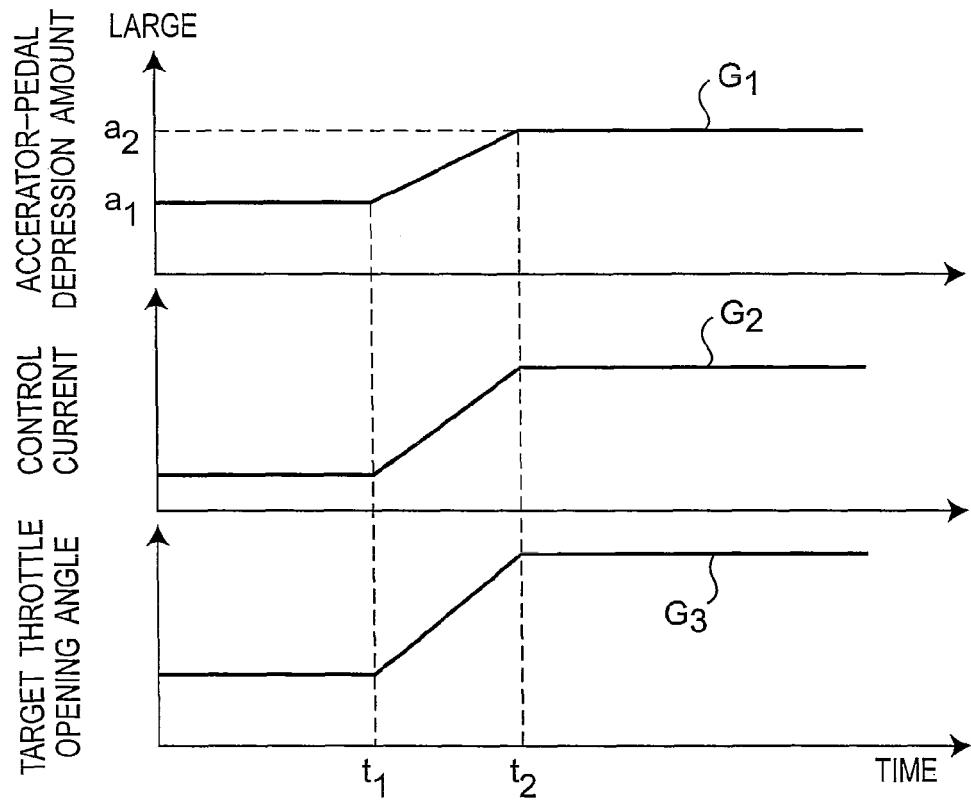
FIG. 4 is a graph showing a temporal change characteristic of a throttle control current and the target throttle opening angle, in a state when the accelerator-pedal depression amount is being changed.

FIG. 4 shows a temporal change characteristic of a throttle control current (graph $G_2$) and a temporal change characteristic of a throttle opening angle (graph $G_3$), in a normal operating condition where, when the automobile is operated at a constant accelerator-pedal depression amount $a_1$, the accelerator pedal 19 is depressed at a time point $t_1$ to start acceleration, and, after a time point $t_2$, the automobile is operated at a constant accelerator-pedal depression amount $a_2$ ($>a_1$), as indicated by the graph $G_1$, i.e., when a current to be supplied to the actuator 16 is not pulsed.

As is clear from FIG. 4, in the normal operating condition of the automobile W1 or the engine 1A, i.e., in a traveling environment of the automobile W1 or an operating condition of the engine 1A where a required engine power is equal to that corresponding to an accelerator-pedal depression amount, a throttle control current to be supplied to the actuator 16 under control of the controller 30 is not a pulsed current but a continuous current. As above, during a normal operation of the automobile W1 or the engine 1A, the target throttle opening angle is set in the same manner as that in this type of conventional automobile or engine.

On the other hand, in a traveling environment or an operating condition where a required engine power is less than an engine power corresponding to an accelerator-pedal depression amount, the throttle control current is pulsed according to a level of an excessive part of the engine power. Specifically, the throttle control current is converted into a pulsed control current which has a pulse height equal to a magnitude of the throttle control current, a predetermined pulse width and a predetermined interpulse interval. As used herein, the term "pulse width" means a pulse OFF period in one ON/OFF cycle (e.g., 1 second, 0.1 seconds or 0.01 seconds), and the term "interpulse interval" means a pulse ON period in the ON/OFF cycle. In the following description, a ratio of a pulse OFF period to one ON/OFF cycle (i.e., a pulse OFF period/one ON/OFF cycle) will be referred to as "pulse OFF rate", for the sake of simplicity. In this case, when the pulse OFF rate is 0 (zero), the throttle control current is not pulsed at all (i.e., has a continuous waveform). When the pulse OFF rate is 1, no throttle control current is supplied to the actuator 16.

Thus, the pulse OFF rate of the pulsed control current is set according to the traveling environment of the automobile W1 or the operating condition of the engine 1A. For example, the traveling environment of the automobile W1 for use in determination on whether a required engine power is less than an engine power corresponding to a target throttle opening angle, may include: a slope of a road surface to be detected by the road-surface slope sensor 32 or calculated based on GPS radio waves; a flatness of a road surface to be evaluated from a forward-road image acquired by the image pickup camera 34; and a velocity and a direction of a wind surrounding the automobile to be detected by the wind velocity/wind direction sensor 33. Specifically, when a road is downhill, or when a road surface has a relatively high flatness, or when a tail wind is blowing, the throttle control current is pulsed at a pulse OFF rate according to a level of the above parameter. In this case, the throttle control current may be pulsed when a downward slope of the road is equal to or greater that a reference value, or when a velocity of the tail wind is equal to or greater that a reference value.

Figure 5A:
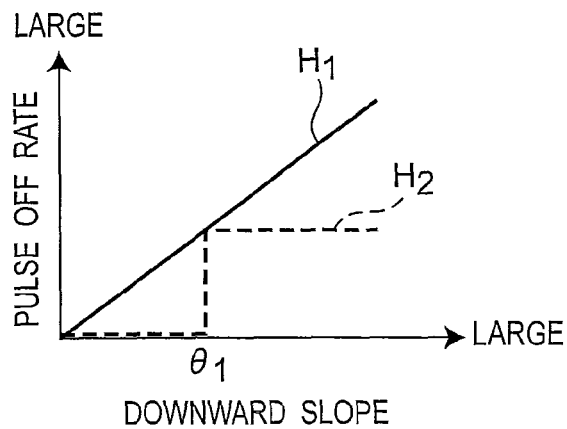
FIG. 5 including (a) and (b) shows graphs showing change characteristics of a pulse OFF rate, with respect to a downward slope of a road surface on which the automobile is traveling, and a velocity of a tail wind to the automobile.

More specifically, as indicated by a graph $H_1$ (solid line) in FIG. 5(a), the pulse OFF rate is set to become larger along with an increase in downward slope of a road surface on which the automobile is traveling. Alternatively, as indicated by a graph $H_2$ (broken line) in FIG. 5(a), the pulse OFF rate may be set to 0 (zero) (i.e., no pulsing operation is performed) when the downward slope of the road surface is less than a predetermined reference value $\theta_1$, and set to a given value when the downward slope is equal to or greater than the reference value $\theta_1$.

Figure 5B:
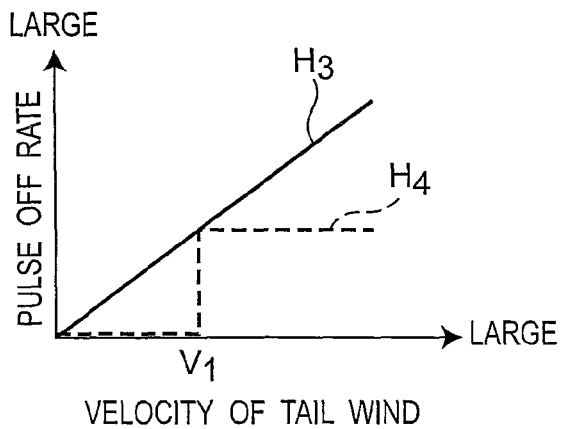

Further, as indicated by a graph $H_3$ (solid line) in FIG. 5(b), the pulse OFF rate is set to become larger along with an increase in velocity of a tail wind to the automobile being traveling. Alternatively, as indicated by a graph $H_4$ (broken line) in FIG. 5(b), the pulse OFF rate may be set to 0 (zero) (i.e., no pulsing operation is performed) when the tail wind velocity is less than a predetermined reference value $V_1$, and set to a given value when the tail wind velocity is equal to or greater than the reference value $V_1$. In cases where a direction of a wind surrounding the automobile is not oriented in a frontward-rearward (longitudinal) direction of the automobile, the tail wind velocity may be determined using a velocity component of the surrounding wind in a forward direction of the automobile.

The operating condition of the engine 1A for use in determination on whether a required engine power is less than an engine power corresponding to a target throttle opening angle, may include the target throttle opening angle itself. Specifically, when the target throttle opening angle falls within the range of 1/5 to 1/10 of a throttle opening angle in the fully opened position of the throttle valve, the throttle control current is converted into a pulsed control signal.

FIG. 6 shows one example of a temporal change characteristic of the throttle control current or the pulsed control current, during the current-pulsing control. In the example illustrated in FIG. 6, in a period between a time point $t_{10}$ and a time point $t_{11}$, the target throttle opening angle becomes equal to or less than a reference value (e.g., ⅕ to 1/10 of the throttle opening angle in the fully opened position of the throttle valve), and the throttle control current is pulsed. Specifically, when the target throttle opening angle is relatively small, a required engine power becomes less than an engine power corresponding to an accelerator-pedal depression amount. Thus, the throttle control current is pulsed, so that an amount of air to be supplied to the combustion chambers 4 is reduced by just as much as equivalent to a pulse OFF period, and thereby an amount of fuel to be supplied to the combustion chambers 4 is reduced. This makes it possible to prevent useless consumption of fuel and eventually enhance fuel economy, i.e., energy efficiency.

In the example illustrated in FIG. 6, in a period between a time point $t_{12}$ and a time point $t_{13}$, a slope of a downhill becomes equal to or greater than a reference value (e.g., 3 to 5 degrees), and the throttle control current is pulsed. Specifically, when a downward slope is relatively large, a gravitational force is applied to the automobile W1 in a forward direction, and thereby a required engine power becomes less than an engine power corresponding to an accelerator-pedal depression amount. Thus, the throttle control current is pulsed, so that an amount of air to be supplied to the combustion chambers 4 is reduced by just as much as equivalent to a pulse OFF period, and thereby an amount of fuel to be supplied to the combustion chambers 4 is reduced. This makes it possible to prevent useless consumption of fuel and eventually enhance fuel economy, i.e., energy efficiency.

Although not illustrated in FIG. 6, when a velocity of a tail wind (or a velocity component of a surrounding wind in a forward direction of the automobile) becomes equal to or greater than a reference value (e.g., 10 to 15 m/sec), the throttle control current is pulsed, in the same manner as that in the case where the downhill slope becomes equal to or greater than the reference value. Specifically, when a tail wind is blowing, a wind force is applied to the automobile W1 in a forward direction, and thereby a required engine power becomes less than an engine power corresponding to an accelerator-pedal depression amount. Thus, the throttle control current is pulsed, so that an amount of air to be supplied to the combustion chambers 4 is reduced by just as much as equivalent to a pulse OFF period, and thereby an amount of fuel to be supplied to the combustion chambers 4 is reduced. This makes it possible to prevent useless consumption of fuel and eventually enhance fuel economy.

As above, in the first embodiment of the present invention, in a situation where a required engine power is less than an engine power corresponding to an accelerator-pedal depression amount (or a target throttle opening angle), a throttle control current is pulsed. Thus, no driving current (or no driving voltage) is supplied to the actuator 16 during a pulse OFF period, so that an amount of air to be supplied to the combustion chambers 4 of the engine 1A is reduced by just as much as equivalent to the pulse OFF period, and consequently an amount of fuel to be supplied to the combustion chambers 4 is reduced. This makes it possible to prevent useless consumption of fuel and eventually enhance fuel economy, i.e., energy efficiency.

(Second Embodiment) With reference to FIGS. 7 to 9, a second embodiment of the present invention will be described below. An automobile W2 according to the second embodiment is equipped with a direct-injection diesel engine 1B (hereinafter referred to as "engine 1B", for brevity) as a prime mover. A structure and functions of the engine 1B will be described below. Except for a difference in engine type, i.e., a diesel engine instead of a spark-ignition engine, and a difference inevitably arising from the difference in engine type, the engine 1B has the same structure and functions as those of the spark-ignition engine 1A in the first embodiment. Thus, in order to avoid a duplicate description, the following description will be made primarily about a difference from the engine 1A in the first embodiment.

Figure 7:
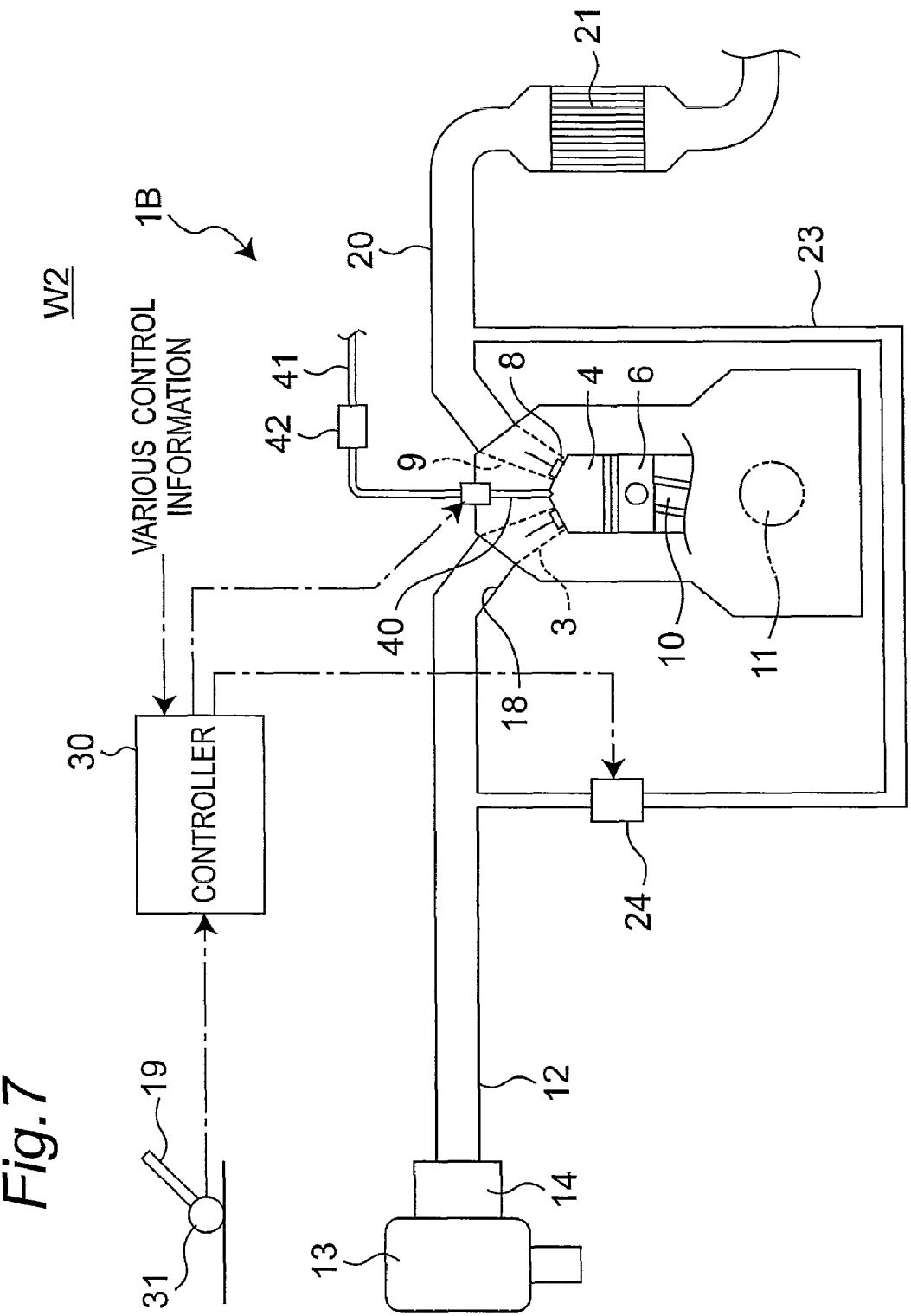
FIG. 7 is a schematic diagram showing a system configuration of a diesel engine mounted on an automobile according to a second embodiment of the present invention.
Figure 8:
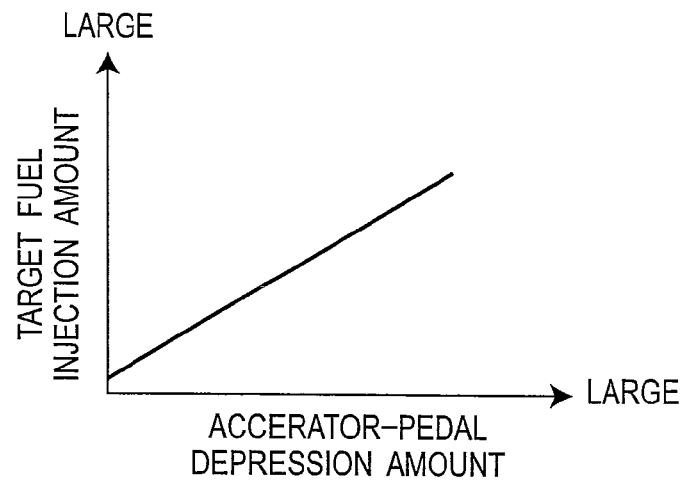
FIG. 8 is a graph showing a relationship between a target fuel injection amount and an accelerator-pedal depression amount, in the engine illustrated in FIG. 7.

As shown in FIG. 7, in the engine 1B, when an intake valve 2 is opened during an intake stroke, air for combustion of fuel (combustion air) is sucked from an intake port 3 into a combustion chamber 4. Then, during a compression stroke, the sucked air in the combustion chamber 4 is compressed by a piston 6, to a high temperature and pressure state. Then, fuel (e.g., diesel oil) is injected from an injector 40 into the high-temperature/pressure sucked air in the combustion chamber 4 at a timing around a top dead center of the compression stroke, and the injected fuel self-ignites during an expansion stroke to undergo combustion. The engine 1B is provided with no spark plug. When an exhaust valve 8 is opened during an exhaust stroke, gas resulting from the combustion, i.e., exhaust gas, is discharged into an exhaust port 9. The series of operations are repeated to allow the piston 6 to be reciprocatingly moved within a cylinder in a repeated manner. A mechanism for converting the reciprocating movement of the piston 6 into a rotational movement of a crankshaft 11 is the same as that of the engine 1A in the first embodiment.

In the engine 1B, the injector 40 is installed to allow an injection nozzle to be exposed to the combustion chamber 4, and adapted to directly inject fuel into the combustion chamber 4. The injector 40 is connected to a fuel supply passage 41, and a high-pressure fuel pump 42 is interposed in the fuel supply passage 41. The high-pressure fuel pump 42 is operable to allow a fuel pressure in the fuel supply passage 41 to be kept at a predetermined value or more. Further, in the engine 1B, a fuel injection from the injector 40 is performed by opening the injector 40 at the timing around the top dead center of the compression stroke, i.e., at a timing capable of self-ignition of the injected fuel, for a time period corresponding to a fuel injection amount. That is, fuel is injected from the injector 40 into the combustion chamber 4 intermittently, i.e., a pulsed manner. The injector 40 is adapted, when a given driving voltage is supplied thereto under control of a controller 30, to be opened so as to inject fuel therefrom, and, when no driving voltage is supplied thereto, to be closed so as to stop the fuel injection.

In an intake system of the engine 1A, no throttle valve is provided in a common intake pipe 12. Thus, air having approximately atmospheric pressure is sucked into the combustion chamber 4. Further, no surge tank is provided, because almost no intake pulsation occurs. A plurality of branched intake pipes 18 for respective ones of a plurality of cylinders are directly branched from the common intake pipe 12. An EGR passage 23 has a downstream end connected to the common intake pipe 12. The remaining structure of the intake system of the engine 1B is the same as that of the engine 1A in the first embodiment.

A control system of the engine 1B or the automobile W2 will be described below. Although not illustrated in detail, the automobile W2 according to the second embodiment or the engine 1B is provided with an accelerator pedal sensor 31, a road-surface slope sensor 32, a wind velocity/wind direction sensor 33, an image pickup camera 34, and a GPS receiving device 35, as with the first embodiment. The engine 1B is further provided with various sensors, such as an intake temperature, an intake pressure sensor, a coolant temperature sensor, an engine speed sensor, and a crank angle sensor, as with the first embodiment. A detection signal of each of the above sensors is input into the controller 30 as control information for the engine 1B.

The controller 30 is a general control unit for the automobile W2, or the engine 1B or its associated device. The controller 30 is a computer which comprises an input/output section (interface), a storage section (ROM, RAM, etc.), a central processing unit (CPU), a timer, and a counter, as with the first embodiment. The controller 30 is operable, based on various data detected by the sensors 14, 31 to 33, the image pickup camera 34, the GPS receiving device 35 and others, and various evaluated or calculated data, to control or drive the injectors 40, an EGR valve 24 and others so as to perform normal controls of the engine 1B, such as normal fuel injection control and normal EGR control. A technique for each of the normal controls of the engine 1B is commonly known to those skilled in the art, and is not the subject matter of the present invention. Thus, its description will be omitted.

Further, the controller 30 is operable, when the engine 1B (or the automobile W2) is in an operating condition (or in a traveling environment) where a required motive power of the engine 1B is less than a motive power of the engine 1B (engine power) corresponding to an accelerator-pedal depression amount (or a target fuel injection amount), to perform a control of reducing a pulse width of a pulsed driving voltage to be supplied to the injector 40, to form a modified pulsed driving voltage (this control will hereinafter be referred to as "pulse-width reduction control").

A technique of the pulse-width reduction control in the second embodiment of the present invention will be described below. In the engine 1B, as shown in FIG. 8, the controller 30 is operable to gradually increase a target fuel injection amount or a fuel injection amount along with an increase in an accelerator-pedal depression amount. In the example illustrated in FIG. 8, the target fuel injection amount is set to be increased in proportion to the accelerator-pedal depression amount. However, a relationship between the target fuel injection amount and the accelerator-pedal depression amount is not limited to such a proportional relationship, but may be set in any desired characteristic, as with the first embodiment.

In the normal operating condition of the automobile W2 or the engine 1B, i.e., in a traveling environment of the automobile W2 or an operating condition of the engine 1B where a required engine power is equal to an engine power corresponding to an accelerator-pedal depression amount, a driving voltage having a pulse width corresponding to a target fuel injection amount is supplied to the injector 40 under control of the controller 30. That is, during a normal operation of the automobile W2 or the engine 1B, a fuel injection pulse width is set in the same manner as that in this type of conventional automobile or engine.

On the other hand, in a traveling environment or an operating condition where a required engine power is less than an engine power corresponding to an accelerator-pedal depression amount, the pulse width of the pulsed driving voltage to be supplied to the injector 40 is reduced at a predetermined pulse-width reduction rate. In this case, when the pulse-width reduction rate is 0 (zero), fuel is injected with a pulse width equal to that during the normal operation. When the pulse-width reduction rate is 1, the injector 40 is not opened at all, i.e., no fuel is injected.

In the second embodiment, the pulse-width reduction rate of the pulsed driving voltage for the injector 40 is set according to the traveling environment of the automobile W2 or the operating condition of the engine 1B. The traveling environment of the automobile W2 for use in determination on whether a required engine power is less than an engine power corresponding to an accelerator-pedal depression amount, may include a slope of a road surface, a flatness of a road surface, and a velocity and a direction of a wind surrounding the automobile W2, as with the first embodiment. Specifically, when a road is downhill, or when a road surface has a relatively high flatness, or when a tail wind is blowing, the pulse width of the pulsed driving voltage is reduced at a pulse-width reduction rate according to a level of the above parameter. In this case, it is preferable that the pulse width is reduced when a downward slope of the road surface is equal to or greater that a reference value, or when a velocity of the tail wind is equal to or greater that a reference value. The pulse-width reduction rate of the driving voltage is set according to a downward slope of a road surface on which the automobile is traveling, or a velocity of a tail wind to the automobile, in the same manner as that for the pulse OFF rate in the first embodiment.

Figure 9:
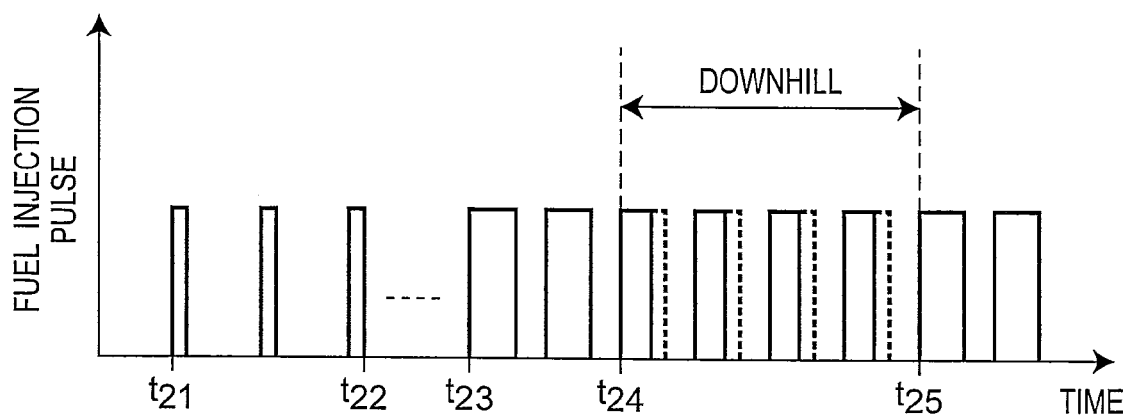
FIG. 9 is a graph showing one example of a temporal change characteristic of a fuel injection pulse, in the engine illustrated in FIG. 7.

FIG. 9 shows one example of a temporal change characteristic of the pulsed driving voltage or fuel injection pulses, during the pulse-width reduction control. In FIG. 9, an interval between respective adjacent ones of the fuel injection pulses is reduced in a direction of the time axis, for the shake of illustration. That is, actually, the fuel injection pulses are more spaced apart from each other in the direction of the time axis. In the example illustrated in FIG. 9, in a period between a time point $t_{21}$ and a time point $t_{22}$, the accelerator-pedal depression amount is relatively small, and thereby the fuel injection pulse has a relatively small pulse width. Further, in a period after a time point $t_{23}$, the accelerator-pedal depression amount is relatively large, and thereby the fuel injection pulse has a relatively large pulse width.

In the example illustrated in FIG. 9, in a period between a time point $t_{24}$ and a time point $t_{25}$, a slope of a downhill becomes equal to or greater than a reference value (e.g., 3 to 5 degrees), and the pulse width of the fuel injection pulse is reduced at a given pulse-width reduction rate according to the slope. In FIG. 9, the broken line indicates a pulse width in a state before being reduced. Specifically, when a downward slope is relatively large, a gravitational force is applied to the automobile W2 in a forward direction, and thereby a required engine power becomes less than an engine power corresponding to an accelerator-pedal depression amount. Thus, the pulse width of the fuel injection pulse is reduced, so that an amount of fuel to be supplied to the combustion chambers 4 is reduced by just as much as equivalent to a reduction in pulse width. This makes it possible to prevent useless consumption of fuel and eventually enhance fuel economy, i.e., energy efficiency.

Although not illustrated in FIG. 9, when a velocity of a tail wind (or a velocity component of a surrounding wind in a forward direction of the automobile) becomes equal to or greater than a reference value (e.g., 10 to 15 m/sec), the pulse width of the fuel injection pulse is reduced, in the same manner as that in the case where the downhill slope becomes equal to or greater than the reference value. The reason is that, when a tail wind is blowing, a wind force is applied to the automobile W2 in a forward direction, and thereby a required engine power becomes less than an engine power corresponding to an accelerator-pedal depression amount.

As above, in the second embodiment of the present invention, the automobile W2 or the engine 1B can prevent useless consumption of fuel and eventually enhance fuel economy, i.e., energy efficiency, as with the first embodiment.

Figure 10:
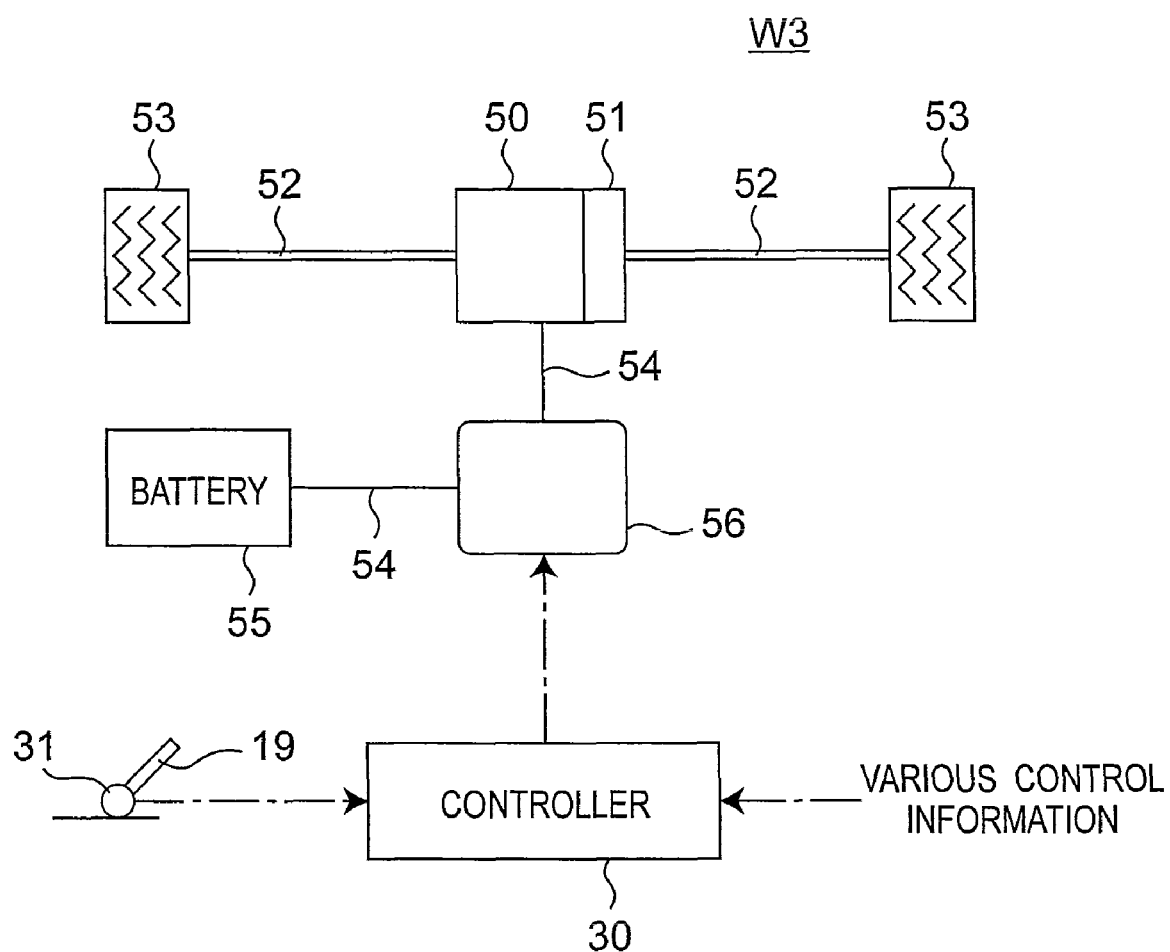
FIG. 10 is a schematic diagram showing a system configuration of a drive-line of an electric automobile according to a third embodiment of the present invention.

(Third Embodiment) With reference to FIGS. 10 to 12, a third embodiment of the present invention will be described below. As shown in FIG. 10, an electric automobile W3 according to the third embodiment is equipped with a DC series-wounded motor 50 (hereinafter referred to as "motor 50") as a prime mover. A motive power or torque output from the motor 50 (hereinafter referred to as "motor power") is transmitted to right and left road wheels 53 via a differential mechanism 51 and right and left axles 52.

The motor 50 is connected to a buttery 55 through a lead wire 54, and a voltage supply circuit 56 is interposed in the lead wire 54. For example, the voltage supply circuit 56 is provided with a variable resistor, and adapted, based on a control signal from a controller 30, to continuously control a voltage to be supplied to the motor 50, according to an accelerator-pedal depression amount, so as to control a motor power. Although not illustrated in detail, the electric automobile W3 according to the third embodiment is provided with an accelerator pedal sensor 31, a road-surface slope sensor 32, a wind velocity/wind direction sensor 33, an image pickup camera 34, and a GPS receiving device 35, as with the first embodiment. A detection signal of each of the above sensors is input into the controller 30 as control information for the electric automobile W3.

The controller 30 is a general control unit for the automobile W3. The controller 30 is a computer which comprises an input/output section (interface), a storage section (ROM, RAM, etc.), a central processing unit (CPU), a timer, and a counter. The controller 30 is operable, based on various data detected by the sensors 31 to 33, the image pickup camera 34, the GPS receiving device 35 and others, and various evaluated or calculated data, to control the voltage supply circuit 56.

Figure 11:
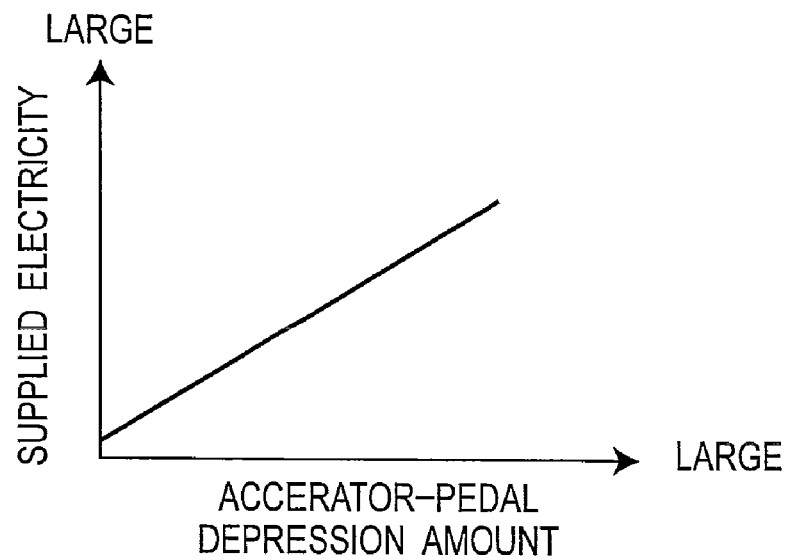
FIG. 11 is a graph showing a relationship between an electricity to be supplied to a motor and an accelerator-pedal depression amount, in the electric automobile illustrated in FIG. 10.

In the electric automobile W3, as shown in FIG. 11, the controller 30 is operable to gradually increase a target supply electricity (or a target supply voltage) for the motor 50, along with an increase in an accelerator-pedal depression amount. In the example illustrated in FIG. 11, the target supply electricity is set to be increased in proportion to the accelerator-pedal depression amount. However, a relationship between the target supply electricity and the accelerator-pedal depression amount is not limited to such a proportional relationship, but may be set in any desired characteristic, as with the first embodiment. Further, the controller 30 is operable, when the electric automobile W3 is in a traveling environment or an operating condition where a required motive power is less than a motive power corresponding to an accelerator-pedal depression amount, to perform a control of pulsing a continuous voltage to be supplied to the motor 50 (this control will hereinafter be referred to as "control voltage-pulsing control").

In the control voltage-pulsing control, in the normal operating condition of the electric automobile W3, i.e., in a traveling environment or an operating condition of the electric automobile W3 where a required motor power is equal to a motor power corresponding to an accelerator-pedal depression amount (or a target supply electricity), a continuous control signal corresponding to the target supply electricity is supplied to the voltage supply circuit 56 under control of the controller 30. That is, during a normal operation of the electric automobile W3, a continuous voltage is supplied to the motor 50 in the same manner as that in this type of conventional electric automobile.

On the other hand, in a traveling environment or an operating condition where a required motor power is less than a motor power corresponding to an accelerator-pedal depression amount, the continuous voltage to be supplied to the motor 50 is pulsed at a predetermined pulse OFF rate. In this case, when the pulse OFF rate is 0 (zero), the continuous voltage is supplied to the motor 50 in the same manner as that during the normal operation. When the pulse OFF rate is 1, no electricity is supplied to the motor 50.

In the third embodiment, the pulse OFF rate of the continuous voltage to be supplied to the motor 50 is set according to the traveling environment or the operating condition of the electric automobile W3. The traveling environment for use in determination on whether a required motor power is less than a motor power corresponding to an accelerator-pedal depression amount, may include a slope of a road surface, a flatness of a road surface, and a velocity and a direction of a wind surrounding the electric automobile W3, as with the first embodiment. Specifically, when a road is downhill, or when a road surface has a relatively high flatness, or when a tail wind is blowing, the continuous voltage is pulsed at a pulse OFF rate according to a level of the above parameter. In this case, it is preferable that the continuous voltage is pulsed when a downward slope of the road surface is equal to or greater that a reference value, or when a velocity of the tail wind is equal to or greater that a reference value. The pulse OFF rate of the supply voltage for the motor 50 is set according to a downward slope of a road surface on which the electric automobile W3 is traveling, or a velocity of a tail wind to the electric automobile W3, in the same manner as that for the pulse OFF rate in the first embodiment.

Figure 12:
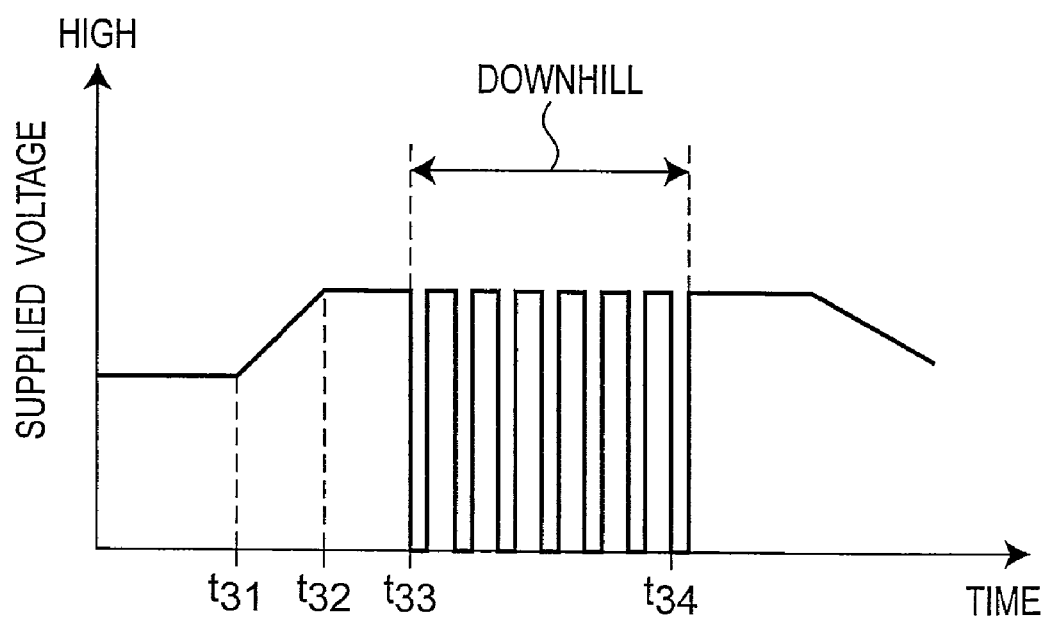
FIG. 12 is a graph showing one example of a temporal change characteristic of a voltage to be supplied to the motor, in the electric automobile illustrated in FIG. 10.

FIG. 12 shows one example of a temporal change characteristic of the supply voltage for the motor 50, during the voltage-pulsing control. In the example illustrated in FIG. 12, before a time point $t_{31}$, the accelerator-pedal depression amount is relatively small, and thereby the supply voltage is relatively low. Then, after a time point $t_{32}$, the accelerator-pedal depression amount is relatively large, and thereby the supply voltage is relatively high.

In the example illustrated in FIG. 12, in a period between a time point $t_{33}$ and a time point $t_{34}$, a slope of a downhill becomes equal to or greater than a reference value (e.g., 3 to 5 degrees), and the supply voltage is pulsed at a given pulse OFF rate according to the slope. Specifically, when a downward slope is relatively large, a gravitational force is applied to the electric automobile W3 in a forward direction, and thereby a required motor power becomes less than a motor power corresponding to an accelerator-pedal depression amount. Thus, the supply voltage is pulsed, so that an amount of electricity to be supplied to the motor 50 is reduced by just as much as equivalent to a pulse OFF period. This makes it possible to prevent useless consumption of fuel and eventually enhance energy efficiency of the electric automobile W3.

Although not illustrated in FIG. 12, when a velocity of a tail wind (or a velocity component of a surrounding wind in a forward direction of the electric automobile) becomes equal to or greater than a reference value (e.g., 10 to 15 m/sec), the supply voltage for the motor 50 is pulsed, in the same manner as that in the case where the downhill slope becomes equal to or greater than the reference value. The reason is that, when a tail wind is blowing, a wind force is applied to the electric automobile W3 in a forward direction, and thereby a required motor power becomes less than a motor power corresponding to an accelerator-pedal depression amount.

Figure 13:
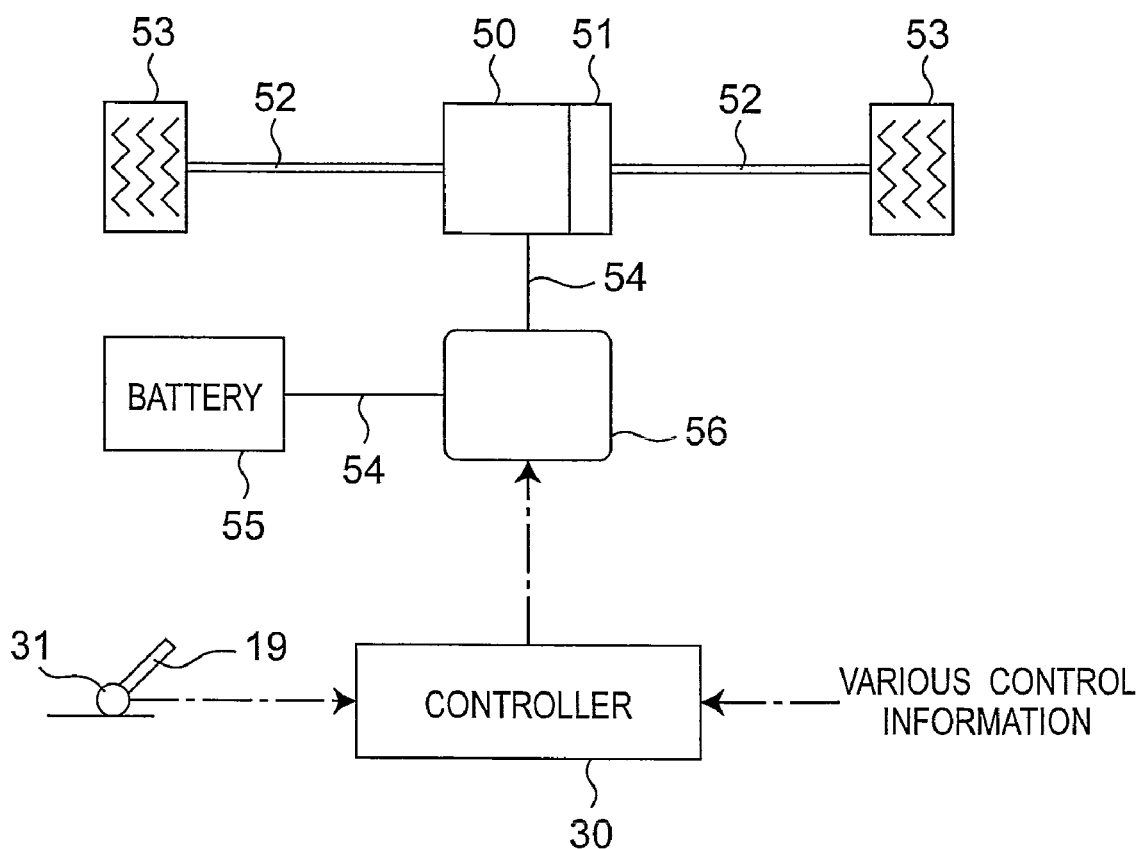
FIG. 13 is a schematic diagram showing a system configuration of a drive-line of an electric automobile according to a fourth embodiment of the present invention.

(Fourth Embodiment) With reference to FIGS. 13 to 15, a fourth embodiment of the present invention will be described below. As shown in FIG. 13, an electric automobile W4 according to the fourth embodiment is equipped with a motor 50, as with the third embodiment. A motive power is transmitted to right and left road wheels 53 via a differential mechanism 51 and right and left axles 52. The motor 50 is connected to a buttery 55 through a lead wire 54, as with the third embodiment.

In the electric automobile W4 according to the fourth embodiment, a PWM (pulse-width modulation) chopper circuit 60 is interposed in the lead wire 54. The PWM chopper circuit 60 is adapted, based on a control signal from a controller 30, to control an ON/OFF ratio of a pulsed control voltage to be supplied to the motor 50, according to an accelerator-pedal depression amount, so as to control a motor power. Although not illustrated in detail, the electric automobile W4 according to the fourth embodiment is provided with an accelerator pedal sensor 31, a road-surface slope sensor 32, a wind velocity/wind direction sensor 33, an image pickup camera 34, and a GPS receiving device 35, as with the first embodiment. A detection signal of each of the above sensors is input into the controller 30 as control information for the electric automobile W4.

The controller 30 is a general control unit for the automobile W4. The controller 30 is a computer which comprises an input/output section (interface), a storage section (ROM, RAM, etc.), a central processing unit (CPU), a timer, and a counter. The controller 30 is operable, based on various data detected by the sensors 31 to 33, the image pickup camera 34, the GPS receiving device 35 and others, and various evaluated or calculated data, to control the chopper circuit 60.

Figure 14:
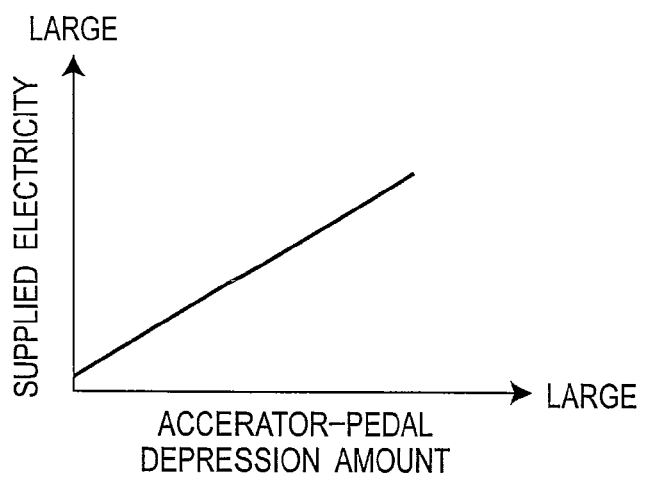
FIG. 14 is a graph showing a relationship between an electricity to be supplied to a motor and an accelerator-pedal depression amount, in the electric automobile illustrated in FIG. 13.

In the electric automobile W4, as shown in FIG. 14, the controller 30 is operable to gradually increase a target supply electricity for the motor 50, along with an increase in an accelerator-pedal depression amount. In the example illustrated in FIG. 14, the target supply electricity is set to be increased in proportion to the accelerator-pedal depression amount. However, a relationship between the target supply electricity and the accelerator-pedal depression amount is not limited to such a proportional relationship, but may be set in any desired characteristic, as with the first embodiment. Further, the controller 30 is operable, when the electric automobile W4 is in a traveling environment or an operating condition where a required motive power is less than a motor power corresponding to an accelerator-pedal depression amount, to perform a control of reducing a pulse width of a pulsed control voltage to be supplied to the motor 50, to form a modified pulsed control voltage (this control will hereinafter be referred to as "voltage pulse-width reduction control").

In the voltage pulse-width reduction control, in the normal operating condition of the electric automobile W4, i.e., in a traveling environment or an operating condition of the electric automobile W4 where a required motor power is equal to a motor power corresponding to an accelerator-pedal depression amount, a pulsed control signal corresponding to the target supply electricity is supplied to the chopper circuit 60 under control of the controller 30. That is, during a normal operation of the electric automobile W4, a pulsed control voltage is supplied to the motor 50 in the same manner as that in this type of conventional electric automobile.

On the other hand, in a traveling environment or an operating condition where a required motor power is less than a motor power corresponding to an accelerator-pedal depression amount, the pulse width of the control voltage to be supplied to the motor 50 is reduced at a predetermined pulse-width reduction rate. In this case, when the pulse-width reduction rate is 0 (zero), the pulsed control voltage is supplied to the motor 50 in the same manner as that during the normal operation. When the pulse OFF rate is 1, no control voltage is supplied to the motor 50.

In the fourth embodiment, the pulse-width reduction rate of the pulsed supply voltage for the motor 50 is set according to the traveling environment or the operating condition of the electric automobile W4. The traveling environment for use in determination on whether a required motor power is less than a motor power corresponding to an accelerator-pedal depression amount, may include a slope of a road surface, a flatness of a road surface, and a velocity and a direction of a wind surrounding the electric automobile W4, as with the first embodiment. Specifically, when a road is downhill, or when a road surface has a relatively high flatness, or when a tail wind is blowing, the pulse width of the pulsed supply voltage is reduced at a pulse-width reduction rate according to a level of the above parameter. In this case, it is preferable that the pulse width is reduced when a downward slope of the road surface is equal to or greater that a reference value, or when a velocity of the tail wind is equal to or greater that a reference value. The pulse-width reduction rate of the supply voltage is set according to a downward slope of a road surface on which the electric automobile W4 is traveling, or a velocity of a tail wind to the electric automobile W4, in the same manner as that for the pulse OFF rate in the first embodiment.

Figure 15:
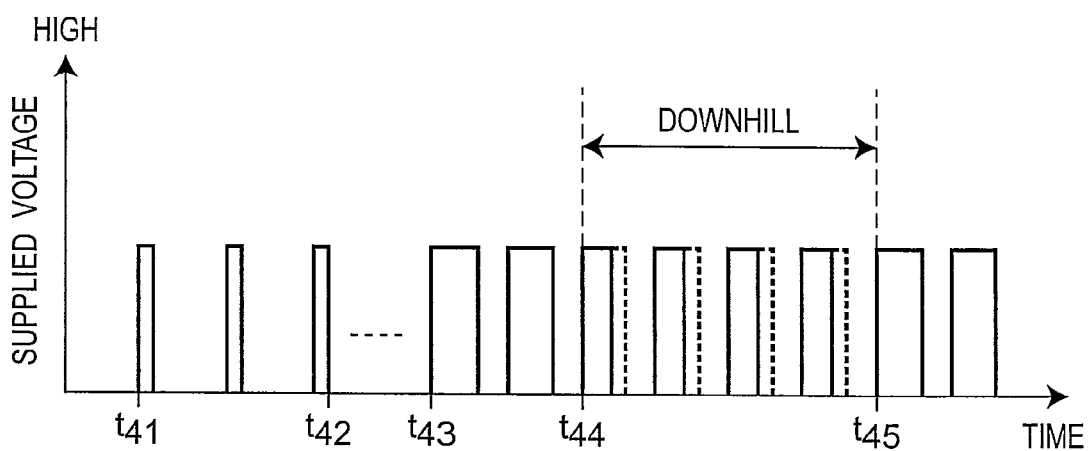
FIG. 15 is a graph showing one example of a temporal change characteristic of a voltage (pulsed voltage) to be supplied to the motor, in the electric automobile illustrated in FIG. 13.

FIG. 15 shows one example of a temporal change characteristic of the supply voltage for the motor 50, during the voltage pulse-width reduction control. In the example illustrated in FIG. 15, in a period between a time point $t_{41}$ and a time point $t_{42}$, the accelerator-pedal depression amount is relatively small, and thereby the pulse width of the supply voltage for the motor 50 is relatively small. Then, after a time point $t_{43}$, the accelerator-pedal depression amount is relatively large, and thereby the pulse width of the supply voltage for the motor 50 is relatively large.

In the example illustrated in FIG. 15, in a period between a time point $t_{44}$ and a time point $t_{45}$, a slope of a downhill becomes equal to or greater than a reference value (e.g., 3 to 5 degrees), and the pulse width of the supply voltage is reduced at a given pulse-width reduction rate according to the slope. In FIG. 15, the broken line indicates a pulse width in a state before being reduced. Specifically, when a downward slope is relatively large, a gravitational force is applied to the electric automobile W4 in a forward direction, and thereby a required motor power becomes less than a motor power corresponding to an accelerator-pedal depression amount. Thus, the pulse width of the supply voltage for the motor 50 is reduced, so that an amount of electricity to be supplied to the motor 50 is reduced by just as much as equivalent to a reduction in pulse width. This makes it possible to prevent useless consumption of fuel and eventually enhance energy efficiency of the electric automobile W4.

Although not illustrated in FIG. 15, when a velocity of a tail wind (or a velocity component of a surrounding wind in a forward direction of the electric automobile) becomes equal to or greater than a reference value (e.g., 10 to 15 m/sec), the pulse width of the supply voltage for the motor 50 is reduced, in the same manner as that in the case where the downhill slope becomes equal to or greater than the reference value. The reason is that, when a tail wind is blowing, a wind force is applied to the electric automobile W4 in a forward direction, and thereby a required motor power becomes less than a motor power corresponding to an accelerator-pedal depression amount.

Although the present invention has been described in connection with specific embodiments thereof, it is to be understood that various changes and modifications will be apparent to those skilled in the art. Therefore, the present invention is not limited to such specific embodiments, but the scope of the invention should be determined by the appended claims and their legal equivalents.

What is claimed is:

1. An automobile comprising:
a prime mover adapted to generate motive power from an energy source;
an energy-source supply system adapted to supply an energy source to the prime mover;
an accelerator pedal adapted to be manipulated according to a depressing action by a driver;
an accelerator pedal sensor adapted to detect a depression amount of the accelerator pedal; and
a controller adapted to calculate a target operating amount of the energy-source supply system corresponding to the accelerator-pedal depression amount detected by the accelerator pedal sensor, and output a continuous control signal corresponding to the target operating amount to the energy-source supply system to actuate the energy-source supply system so as to control an supply amount of the energy source for the prime mover, the controller being operable, in a traveling environment or an operating condition where a motive power required for the prime mover is less than a motive power corresponding to the target operating amount, to convert the continuous control signal into a pulsed control signal which has a pulse height equal to a magnitude of the continuous control signal, a predetermined pulse width and a predetermined interpulse interval, and output the pulsed control signal to the energy-source supply system.

2. The automobile according to claim 1, wherein:
the prime mover is a spark-ignition engine;
the energy-source supply system comprises an electronically-controlled throttle valve adapted to have an opening angle which is controlled according to the accelerator-pedal depression amount, and a fuel injection valve adapted to supply fuel to the engine at a predetermined rate with respect to air flowing through the throttle valve;
the energy source is fuel for a spark-ignition engine; and
the controller is adapted to calculate a target opening angle of the throttle valve corresponding to the accelerator-pedal depression amount, and output a continuous control signal corresponding to the target opening angle to the throttle valve to actuate the throttle valve.

3. The automobile according to claim 2, wherein the operating condition is a target opening angle of the throttle valve.

4. The automobile according to claim 3, wherein the controller is operable, when the target opening angle of the throttle valve is equal to or less than a reference value, to convert the continuous control signal into the pulsed control signal.

5. The automobile according to claim 1, wherein:
the prime mover is an electric motor;
the energy-source supply system comprises a voltage supply circuit adapted to control a supply voltage for the electric motor, according to the accelerator-pedal depression amount;
the energy source is electricity; and
the controller is adapted to calculate a target supply voltage of the voltage supply circuit corresponding to the accelerator-pedal depression amount, and output a continuous control signal corresponding to the target supply voltage to the voltage supply circuit to actuate the voltage supply circuit.

6. The automobile according to claim 5, wherein:
the voltage supply circuit is a variable resistor circuit which is connected in series with the electric motor, and adapted to have an electric resistance which is controlled according to the accelerator-pedal depression amount; and
the controller is adapted to calculate a target electric resistance of the variable resistor circuit corresponding to the accelerator-pedal depression amount, and output a continuous control signal corresponding to the target electric resistance to the variable resistor circuit to actuate the variable resistor circuit.

7. The automobile according to claim 1, which comprises at least one selected from the group consisting of: road surface slope-detecting means adapted to detect a slope of a road surface on which the automobile is traveling; road surface flatness-detecting means adapted to detect a flatness of the road surface; and a wind velocity/wind direction detector adapted to detect a velocity and a direction of a wind surrounding the automobile.

8. The automobile according to claim 7, wherein the road surface slope-detecting means is provided with a GPS receiving device, and adapted to detect a slope of the road surface, based on GPS radio waves received by the GPS receiving device.

9. The automobile according to claim 7, wherein the road surface flatness-detecting means is provided with an image pickup camera, and adapted to detect a flatness of the road surface, based on an image picked up by the image pickup camera to represent a scene forward of the automobile.

10. The automobile according to claim 7, wherein the traveling environment is at least one selected from the group consisting of: a slope of a road surface on which the automobile is traveling; a flatness of the road surface; and a velocity and a direction of a wind surrounding the automobile.

11. The automobile according to claim 10, wherein the controller is operable, under at least one of the conditions that a downward slope of the road surface is equal to or greater than a reference value, that a flatness of the road surface is better than a reference state, and that a velocity of a tail wind is equal to or greater than a reference value, to convert the continuous control signal into the pulsed control signal.

12. An automobile comprising:
a prime mover adapted to generate motive power from an energy source;
an energy-source supply system adapted to supply an energy source to the prime mover;
an accelerator pedal adapted to be manipulated according to a depressing action by a driver;
an accelerator pedal sensor adapted to detect a depression amount of the accelerator pedal; and
a controller adapted to calculate a target operating amount of the energy-source supply system corresponding to the accelerator-pedal depression amount detected by the accelerator pedal sensor, and output a pulsed control signal corresponding to the target operating amount to the energy-source supply system to actuate the energy-source supply system so as to control an supply amount of the energy source for the prime mover, the controller being operable, in a traveling environment or an operating condition where a motive power required for the prime mover is less than a motive power corresponding to the target operating amount, to reduce a pulse width of the pulsed control signal to form a modified pulsed control signal, and then output the modified pulsed control signal to the energy-source supply system.

13. The automobile according to claim 12, wherein:
the prime mover is a diesel engine;
the energy-source supply system comprises an electronically-controlled injector adapted to have a fuel injection amount which is controlled according to the accelerator-pedal depression amount;
the energy source is fuel for a diesel engine; and
the controller is adapted to calculate a target fuel injection amount of the injector corresponding to the accelerator-pedal depression amount, and output a pulsed control signal corresponding to the target fuel injection amount to the injector to actuate the injector.

14. The automobile according to claim 12, wherein:
the prime mover is an electric motor;
the energy-source supply system comprises an electronically-controlled chopper circuit adapted to control an ON/OFF ratio of a supply voltage for the electric motor, according to the accelerator-pedal depression amount;
the energy source is electricity; and
the controller is adapted to calculate a target ON/OFF ratio of the chopper circuit corresponding to the accelerator-pedal depression amount, and output a pulsed control signal corresponding to the target ON/OFF ratio to the chopper circuit to actuate the chopper circuit.

15. The automobile according to claim 12, which comprises at least one selected from the group consisting of: road surface slope-detecting means adapted to detect a slope of a road surface on which the automobile is traveling; road surface flatness-detecting means adapted to detect a flatness of the road surface; and a wind velocity/wind direction detector adapted to detect a velocity and a direction of a wind surrounding the automobile.

16. The automobile according to claim 15, wherein the road surface slope-detecting means is provided with a GPS receiving device, and adapted to detect a slope of the road surface, based on GPS radio waves received by the GPS receiving device.

17. The automobile according to claim 15, wherein the road surface flatness-detecting means is provided with an image pickup camera, and adapted to detect a flatness of the road surface, based on an image picked up by the image pickup camera to represent a scene forward of the automobile.

18. The automobile according to claim 15, wherein the traveling environment is at least one selected from the group consisting of: a slope of a road surface on which the automobile is traveling; a flatness of the road surface; and a velocity and a direction of a wind surrounding the automobile.

19. The automobile according to claim 18, wherein the controller is operable, under at least one of the conditions that a downward slope of the road surface is equal to or greater than a reference value, that a flatness of the road surface is better than a reference state, and that a velocity of a tail wind is equal to or greater than a reference value, to reduce a pulse width of the pulsed control signal.

* * * * *